United States Patent [19]

Pierce et al.

[11] Patent Number: 4,797,291
[45] Date of Patent: Jan. 10, 1989

[54] METHOD OF PREPARING A COMESTIBLE WITH INSERT

[75] Inventors: William W. Pierce, 3030 McKinney Ave., No. 802, Dallas, Tex. 75204; George June, Indianapolis, Ind.; James M. Meadows, Dallas, Tex.; Albert G. Cheek, Richmond, Ind.

[73] Assignee: William W. Pierce, Chicago, Ill.

[21] Appl. No.: 750,593

[22] Filed: Jul. 1, 1985

[51] Int. Cl.⁴ ............................ A21D 8/04; A23P 1/08
[52] U.S. Cl. ........................................ 426/63; 426/90; 426/87; 426/383; 426/420; 426/502
[58] Field of Search ............... 426/94, 502, 134, 90, 426/91, 420, 383, 87, 63

[56] References Cited

U.S. PATENT DOCUMENTS

| | | | |
|---|---|---|---|
| 1,502,006 | 7/1924 | Alvoro | 426/134 |
| 3,656,968 | 4/1972 | Allen | 426/94 |
| 3,753,737 | 8/1973 | Latham et al. | 99/113 |
| 3,804,956 | 4/1974 | Bongiovanni | 426/134 |
| 3,958,035 | 5/1976 | Stearns et al. | 426/614 |
| 4,139,644 | 2/1979 | Stephenson | 426/134 |
| 4,399,156 | 8/1983 | Bernal | 426/94 |
| 4,517,203 | 5/1985 | Levine | 426/502 |
| 4,518,617 | 5/1985 | Haas, Sr. | 426/502 |
| 4,526,795 | 7/1985 | Wolf | 426/502 |

OTHER PUBLICATIONS

Hahn, The Cooking of China, 1968, p. 195.
Better Homes and Gardens, Oriental Cookbook, 1980, pp. 86, 87.
Lina Sturges, Southern Living Cookies Cookbook, 1983, p. 56.
A. Fritsch K. G. of West Germany, Brochure page showing Item 19 "Folding Unit."
Photographs 1 and 2 of machinery manufactured by Thomas L. Green & Company, Inc.
Photograph of machinery manufactured by Thomas L. Green & Company, Inc.

Primary Examiner—Steven Weinstein
Assistant Examiner—Mary S. Mims
Attorney, Agent, or Firm—Dressler, Goldsmith, Shore, Sutker & Milnamow, Ltd.

[57] ABSTRACT

A method for producing a comestible product is provided with a first and second layer of food material. An insert article is disposed on the first layer of food material and is positioned inwardly of at least some of the edges of the first layer of food material to define peripheral regions in the first layer of food material which project beyond the insert article. The second layer of food material is in substantial registry with the first layer of food material. In one embodiment, the food material layers are brought into contact with each other and with the insert article by moving the food material along a path to engage a portion of the food material with a cam surface that has at least an upwardly inclined portion that also extends laterally over the path of movement of another portion of the food material whereby one portion of the food material is folded over the other portion of the food material.

19 Claims, 6 Drawing Sheets

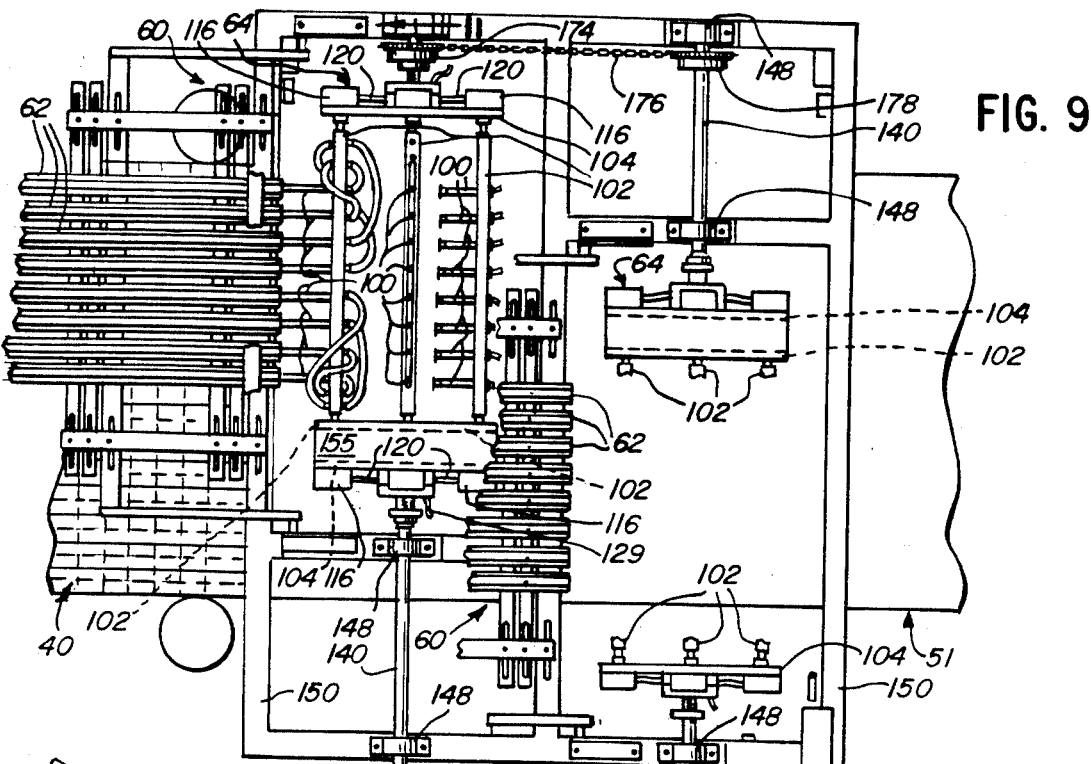
FIG. 9
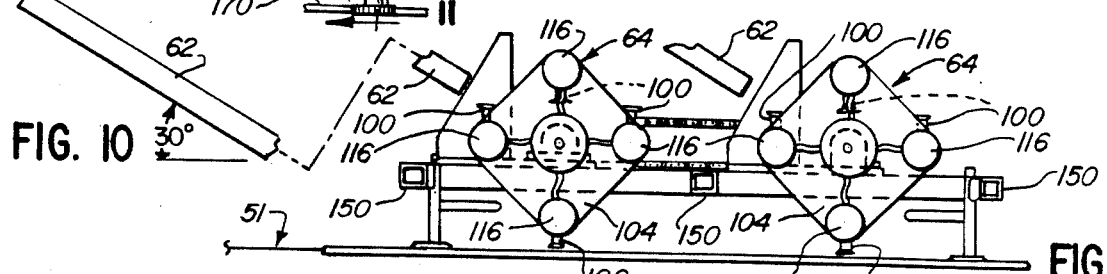
FIG. 10
FIG. 11A
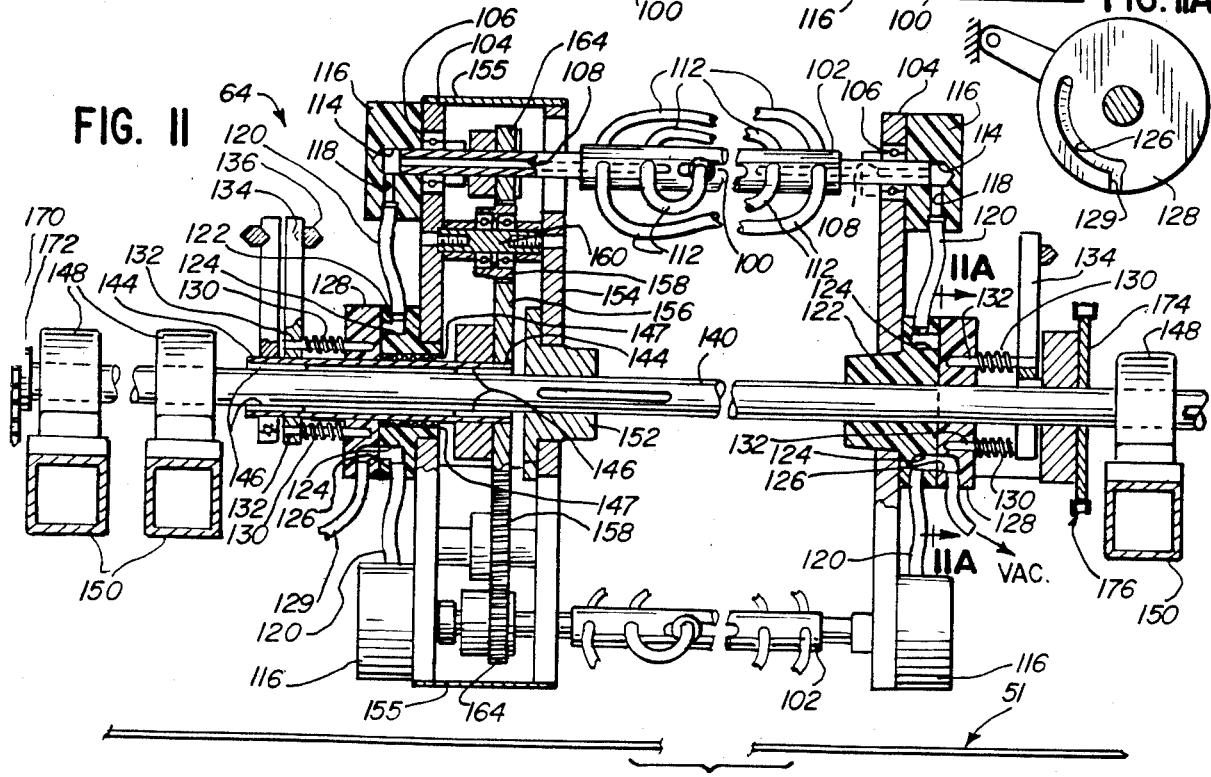
FIG. 11

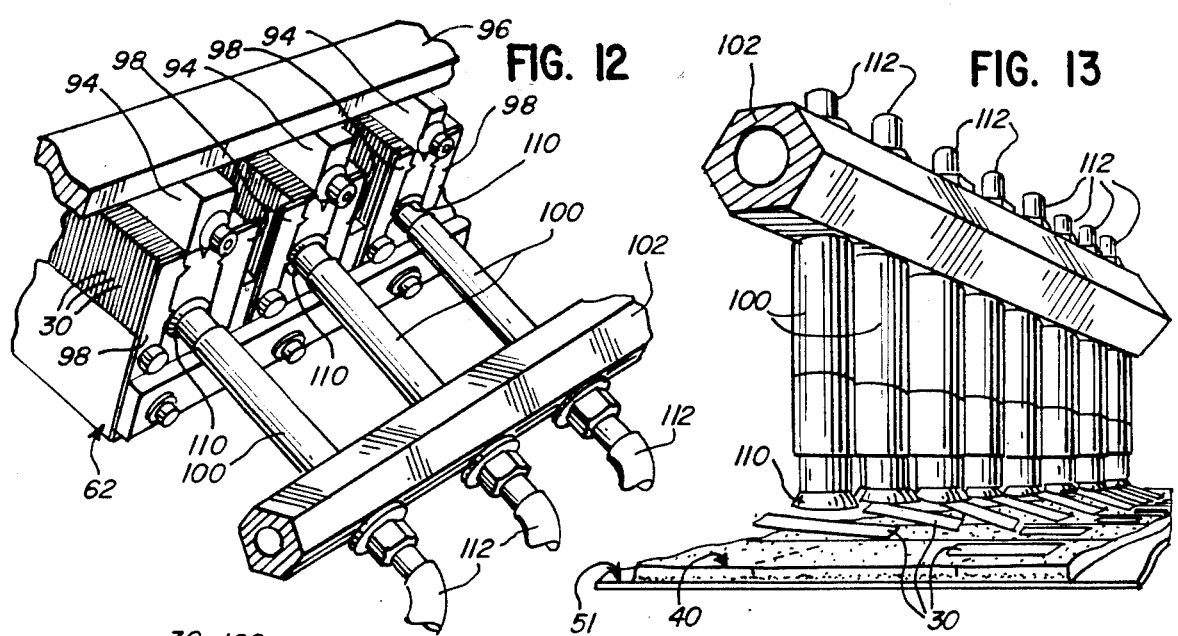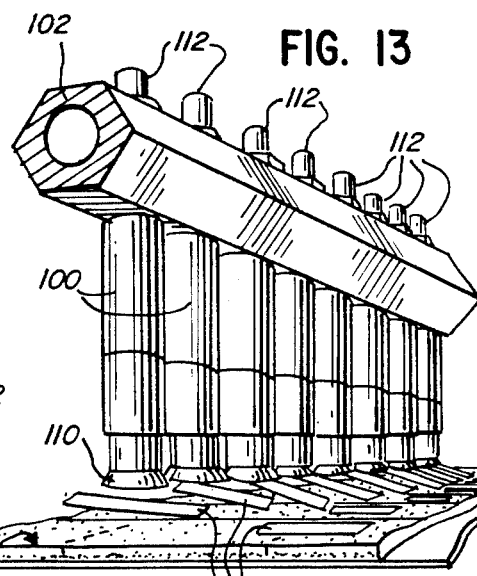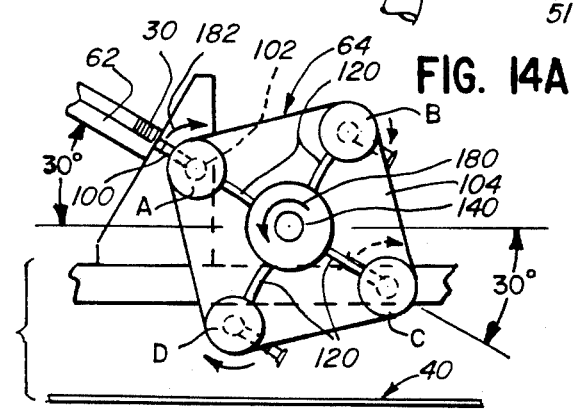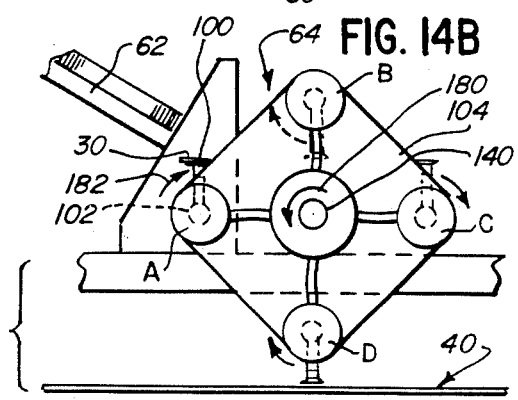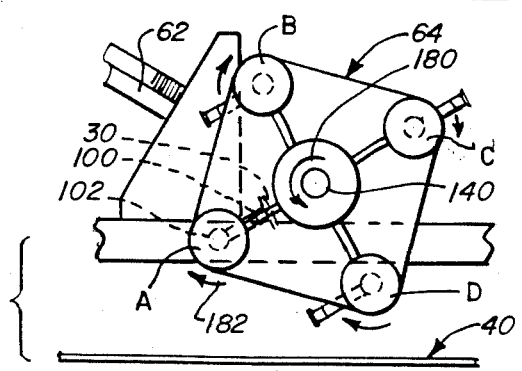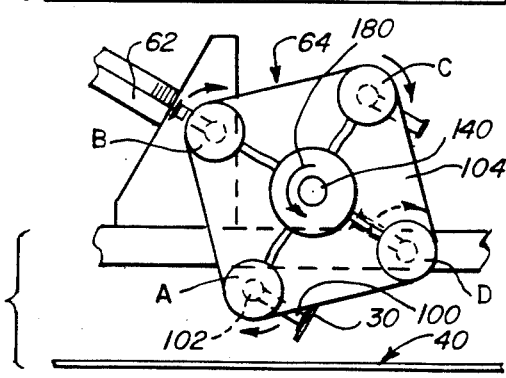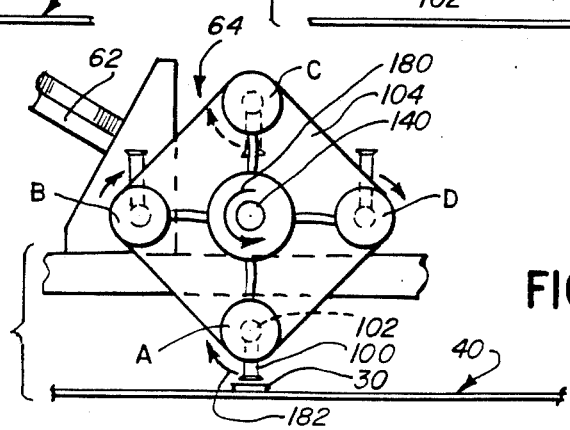

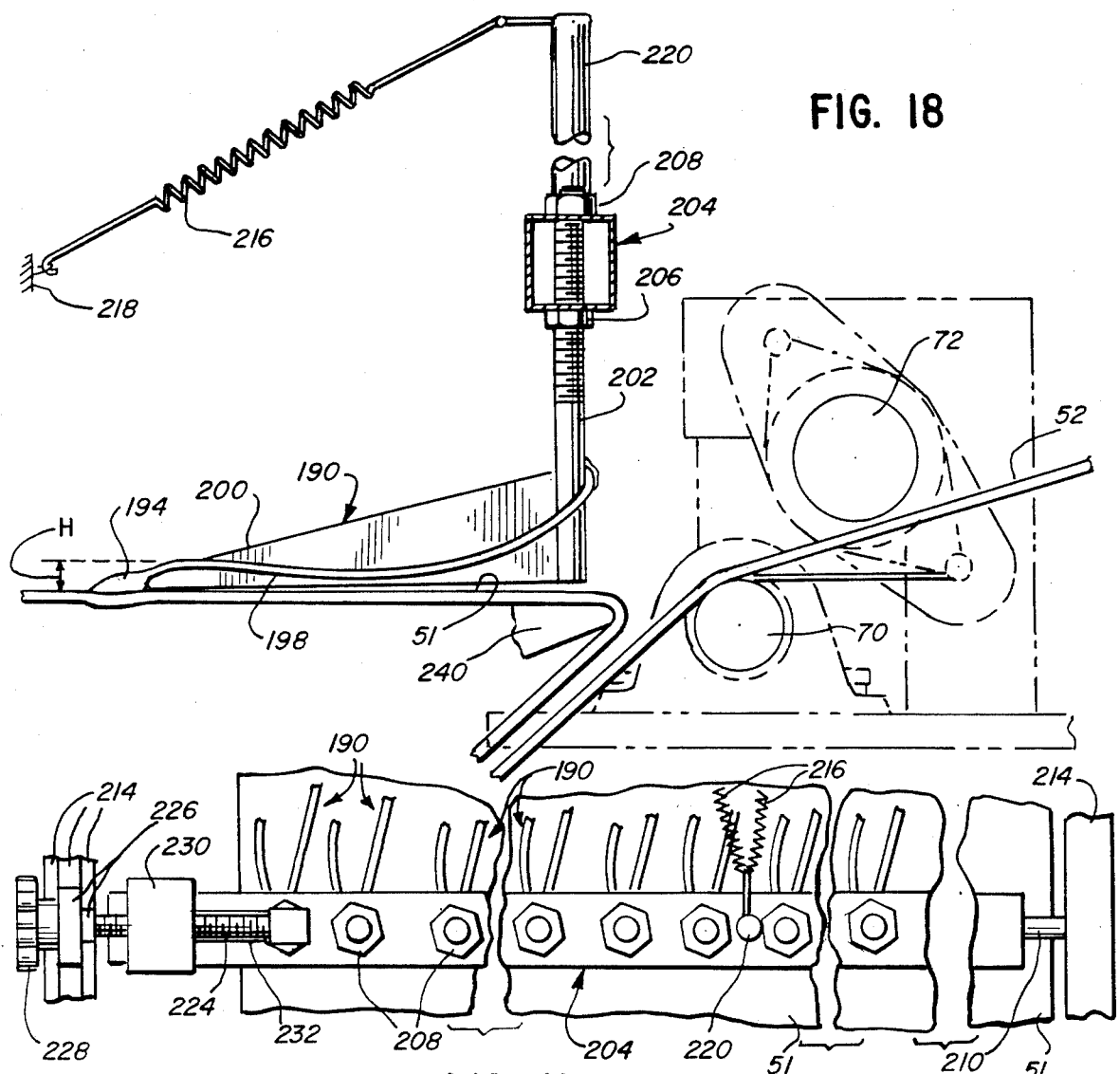
FIG. 18
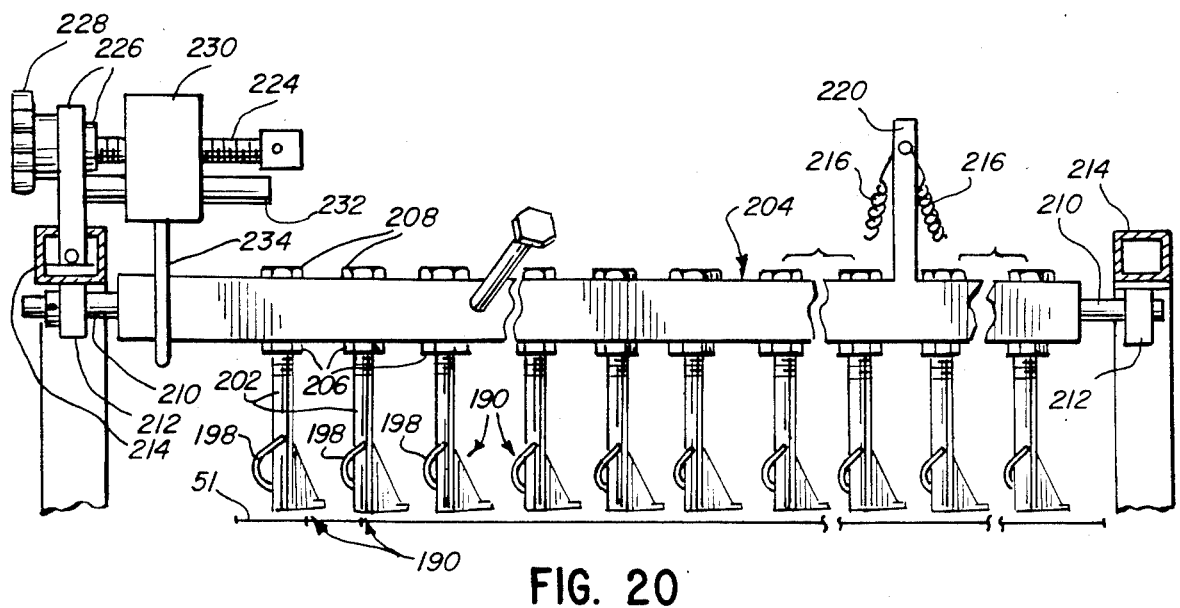
FIG. 19
FIG. 20

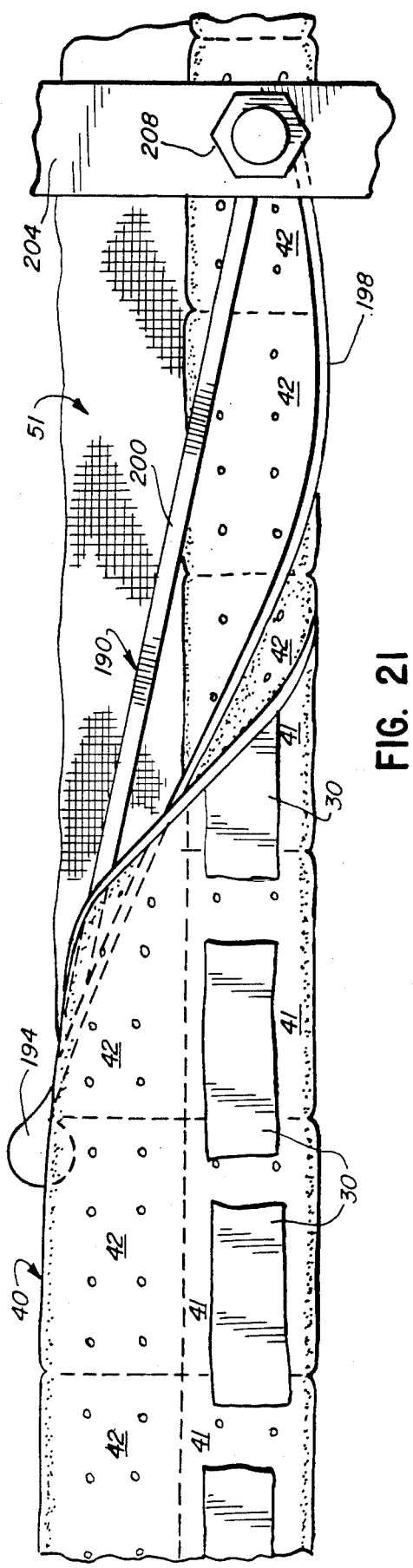
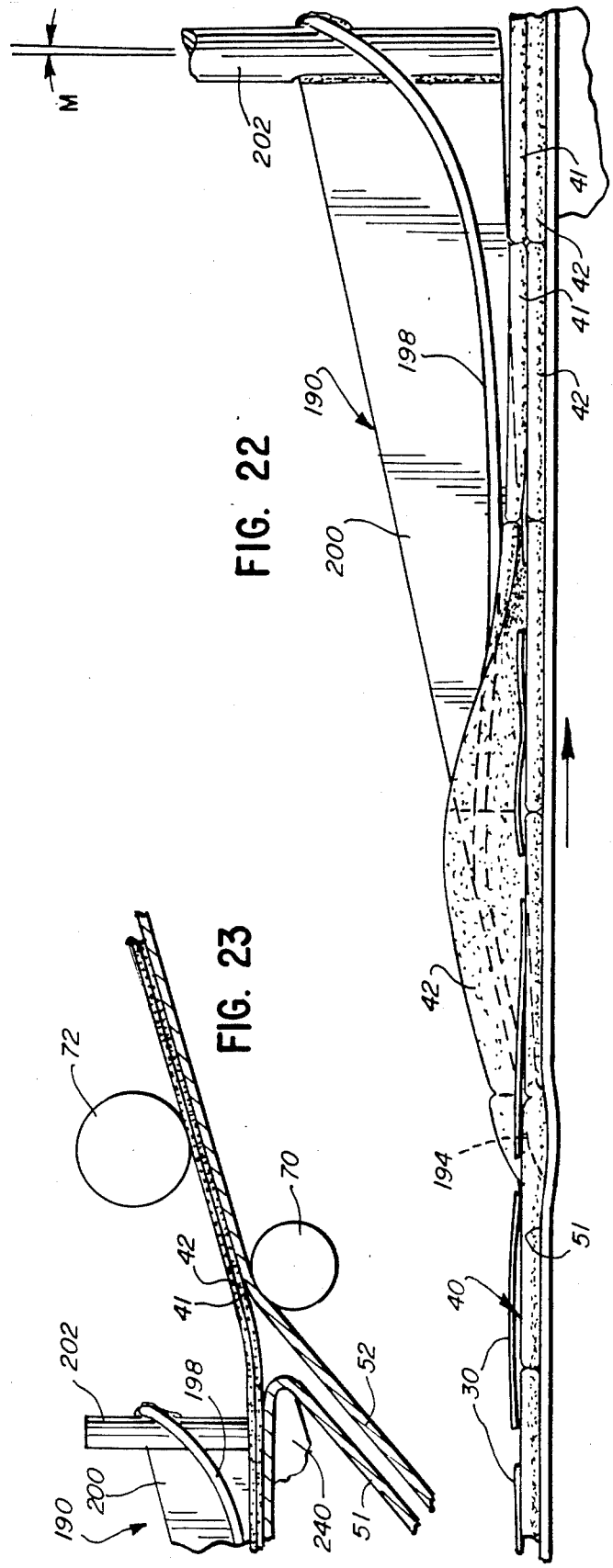
FIG. 21
FIG. 22
FIG. 23

METHOD OF PREPARING A COMESTIBLE WITH INSERT

TECHNICAL FIELD

This invention relates to a food product and to the method and apparatus for making the food product.

BACKGROUND OF THE INVENTION AND TECHNICAL PROBLEMS POSED BY THE PRIOR ART

It has been determined that it would be desirable to provide a food product with an insert article such that the food product can be manipulated or partially eaten so as to completely expose and release the insert article.

In one embodiment of such a product contemplated by the inventors, the insert article is a non-food material, such as a strip of paper, which may be imprinted with design, pictorial, or textual subject matter. For example, the strip of paper could be provided on one side with a question and on the other side with the answer to the question. If the food material containing the paper strip is a snack-type food material, such a product could be served in those social situations where food and/or drinks are typically served (e.g., home entertainment of guests, restaurant dining, cocktail bar and tavern settings, etc.).

A conventional fortune cookie typically contains a slip of paper with a "fortune" printed thereon. The conventional fortune cookie completely surrounds the slip of paper with a convoluted shell-like structure that defines an interior hollow space. Typically, at least portions of the slip of paper are substantially loose in the cookie.

Since each conventional fortune cookie necessarily contains a relatively large amount of "empty space" around the strip of paper, the ratio of the fortune cookie mass to the fortune cookie volume is relatively low. Thus, on a weight (mass) basis, packaging and storage of fortune cookies is relatively inefficient.

Further, the convoluted shell-like structure of the conventional fortune cookie typically requires that the fortune cookie be broken into a number of pieces by hand in order to expose the paper strip containing the fortune. This necessarily results in the formation of a number of fortune cookie pieces and crumbs.

It would be desirable to provide a comestible product containing an insert article in a configuration having a greater mass-to-volume ratio than found in a conventional fortune cookie. This would facilitate more efficient packaging and storage. As a result, there would be a decrease in packaging and transportation costs as measured on a unit mass (weight) basis.

Further, it would be beneficial if such an improved product could be made from, inter alia, dough suitable for pre-dinner or between meal snacks.

Additionally, it would be especially desirable to provide such an improved product with a structure and configuration that would accommodate the manufacture of the product on a high speed, high volume basis.

Further, it would be beneficial if such an improved product had a structure and configuration that could readily accommodate removal of the insert article with little or no breakage so as to minimize the formation of pieces and crumbs. It would also be desirable if such a structure and configuration could readily accommodate manufacture in a convenient "snack" size for ease of handling and eating.

SUMMARY OF THE INVENTION

According to one aspect of the invention, a comestible product is provided with a first nd second layer of food material. An insert article is disposed on the first layer of food material and is positioned inwardly of at least some of the edges of the first layer of food material to define peripheral regions in the first layer of food material which project beyond the insert article. The second layer of food material is substantially in registry with the first layer of food material. The second layer of food material is in contact with the insert article and with the peripheral regions of the first layer of food material whereby at least a portion of the insert article is substantially encapsulated and contained within the food material.

According to another aspect of the invention, the above-described product is made by a unique method. First, a sheet of food material is formed with at least first and second sections. An insert article is positioned or placed adjacent the sections with the insert article being positioned inwardly of at least some of the food material of one of the sections to define peripheral regions which project beyond the insert article. Then relative movement is effected between the two sections to bring the two sections into contact with each other at the peripheral regions and into contact with the insert article whereby at least a portion of the insert article is substantially encapsulated and contained within the food material.

According to another aspect of the invention, the above-described method can be effected with novel apparatus. The apparatus includes means for forming at least first and second sections of food material, conveying means for conveying the sections along a path, and means for positioning an insert article adjacent the sections with the insert article being positioned inwardly of at least some of the food material of one of the sections to define peripheral regions which project beyond the insert article. The apparatus also includes means for effecting relative movement between the two sections to bring the two sections into contact with each other at the peripheral regions and into contact with the insert article whereby at least a portion of the insert article is substantially encapsulated and contained within the food material.

According to another aspect of the invention, a novel mechanism is provided which, inter alia, can be employed to effect a step in the above-described method. The mechanism functions to bring two sections of material into a layered relationship. The mechanism includes a conveyor means for conveying a sheet of food material along a path and includes cam means associated with the conveying means for folding a portion of the food material onto another portion of the food material to form two layers.

Numerous other advantages and features of the present invention will become readily apparent from the following detailed description of the invention, from the claims, and from the accompanying drawings.

BRIEF DESCRIPTION OF THE DRAWINGS

In the accompanying drawings forming part of the specification, in which like numerals are employed to designate like parts throughout the same, FIG. 1 is a perspective view of an embodiment of the comestible product of the present invention;

FIGS. 2-5 are simplified illustrations of the sequential steps of one form of the method of the present invention for making the comestible product of the present invention;

FIG. 6 is a simplified, schematic diagram of an assembly line containing one form of the apparatus of the present invention for manufacturing the comestible product of the present invention according to one form of the method of the present invention;

FIG. 7A is a simplified, fragmentary, perspective view showing a prior art mechanism for severing and perforating dough;

FIG. 7B is a view similar to FIG. 7A, but showing modifications to the apparatus in accordance with the teachings of the present invention;

FIG. 8 is a fragmentary, simplified, perspective view of the insert article placer assemblies;

FIG. 9 is a simplified, fragmentary, top plan view of the insert article placer assemblies with portions of the structure cut away to better illustrate underlying features;

FIG. 10 is a simplified, fragmentary, side elevational view of the insert article placer assemblies;

FIG. 11 is an enlarged, fragmentary, partial cross-sectional, view taken generally along the plane 11—11 in FIG. 10.

FIG. 11A is a cross-sectional view taken generally along the plane 11A—11A in FIG. 11;

FIG. 12 is a greatly enlarged, fragmentary, perspective view of the insert article magazines and insert article gripper mechanism;

FIG. 13 is a fragmentary, perspective view of the insert article gripper members depositing insert article paper strips on a layer of dough;

FIGS. 14A, 14B, 14C, 14D, and 14E are simplified, side elevational schematic views of one insert article placer assembly and show the sequence of its operations;

FIG. 18 is a fragmentary, side elevational view of the dough folding assembly and of the adjacent conveyor and downstream roller assembly;

FIG. 19 is a fragmentary, top plan view of the dough folding assembly;

FIG. 20 is a fragmentary, rear elevational view of the dough folding assembly;

FIG. 21 is a greatly enlarged, fragmentary, top plan view of a dough folding assembly cam surface shown operating in conjunction with the conveyor to fold the dough;

FIG. 22 is a fragmentary, side elevational view of the apparatus illustrated in FIG. 21; and FIG. 23 is a fragmentary, side elevational view of the lower rear portion of the dough folding 5 assembly and of the adjacent conveyor and downstream roller assembly.

DESCRIPTION OF THE PREFERRED EMBODIMENTS

Figure 15:
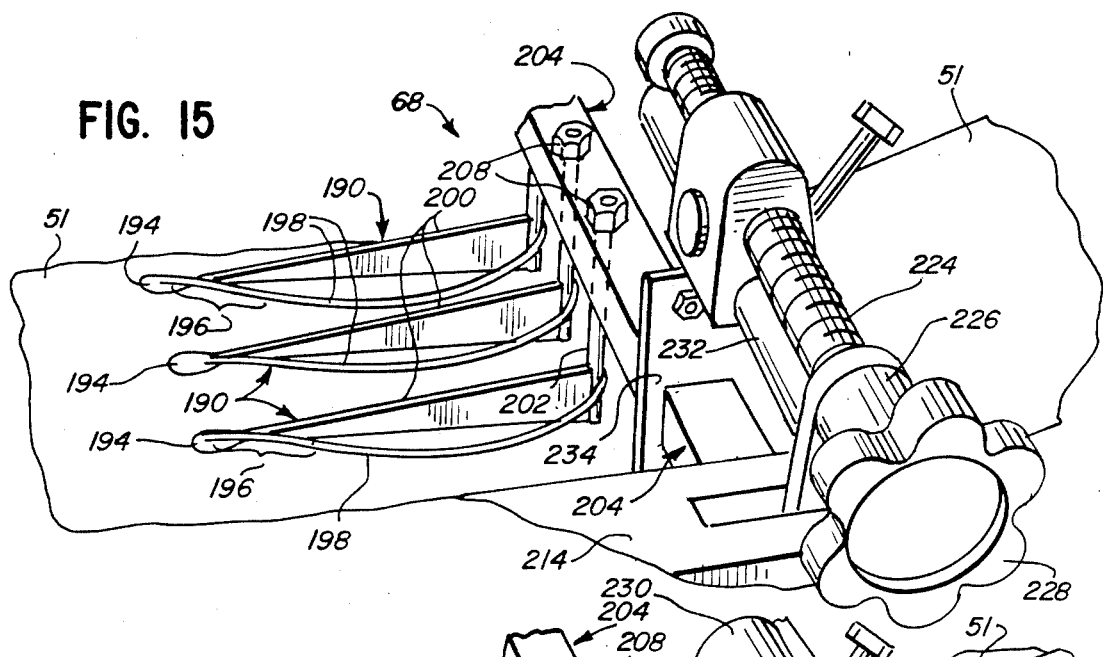
FIG. 15 is a fragmentary, perspective view of the dough folding assembly (cam means) in position on a conveyor in the absence of dough.

While this invention is susceptible of embodiment in many different forms, this specification and the accompanying drawings disclose only some specific forms as an example of the use of the invention. The invention is not intended to be limited to the embodiments so described, and the scope of the invention will be pointed out in the appended claims.

For ease of description, the apparatus of this invention is described in the normal (upright) operating position, and terms such as upper, lower, horizontal, etc., are used with reference to this position. It will be understood, however, that the apparatus of this invention may be manufactured, stored, transported, and sold in an orientation other than the position described.

The apparatus of this invention is used with certain conventional components the details of which, although not fully illustrated or described, will be apparent to those having skill in the art and an understanding of the necessary functions of such components.

Many of the figures illustrating the preferred embodiment of the apparatus show structural details and mechanical elements that will be recognized by one skilled in the art. However, the detailed descriptions of such elements are not necessary to an understanding of the invention, and accordingly, are not herein presented.

THE COMESTIBLE PRODUCT

One form of the comestible product of the present invention is illustrated in FIG. 1 and is designated generally therein by the reference numeral 25. This embodiment of the product 25 is contemplated for use as a cocktail-type snack and has a cracker-like texture. Although the product may be fabricated in a variety of shapes and sizes, the illustrated embodiment would typically have a rectangular configuration as illustrated and would be of a convenient "snack" size, for example, about two inches long, about one inch wide, and about one-quarter inch thick. The particular rectangular configuration illustrated accommodates manufacture of the product in a high speed, high volume process according to one form of the method of the present invention which is described in detail hereinafter.

The product 25 includes an insert article 30 which, in the preferred embodiment illustrated, is a strip of paper imprinted with textual material. For example, on one side of the strip of paper there may be printed a question and on the other side of the strip of paper 30 there may be printed the answer to the question. A design, pictorial representation, puzzle, or the like may be imprinted on the strip of paper in addition to, or instead of, the textual subject matter.

The insert article 30 may be disposed entirely within the product food material. However, in the embodiment illustrated, an end of the elongate insert article 30 projects outwardly a certain distance (e.g., in the illustrated embodiment, about 0.375 inch). This structure results from a novel manufacturing method described in detail hereinafter and this structure aids in manufacturing the product according to such a method at high speed. In addition, the projecting end of the insert article 30 serves to indicate that the product contains the insert article. The exposed end of the insert article 30 can also be grasped for removing the article from the product.

The product 25 is seen to comprise a first layer 31 and a second layer 32. The insert article 30 is disposed on the first layer 31 and is positioned inwardly of at least some of the edges of the layers of food material to define peripheral regions in the layers which project beyond the insert article 30. Preferably, as illustrated in the preferred embodiment shown in FIG. 1, the second layer 32 is substantially in registry with the first layer 31. The second layer 32 is in contact with the insert article 30 and with the peripheral regions of the first layer 31 so that at least a portion of the insert article 30 is substantially encapsulated and contained within the food material.

In the preferred embodiment illustrated in FIG. 1, the layers 31 and 32 of the food material are part of a single sheet of food material which has been folded over along a folded edge 33. However, it is contemplated that in other forms of the product of the present invention, the two layers 31 and 32 need not be unitary parts of a single sheet of food material and may instead be separate layers.

The preferred embodiment of the product 25 is preferably cooked, as by baking, to provide the cracker-like texture. To this end, holes 36 may be provided in each layer 31 and 32 of the food material prior to baking. Typically, the holes 36 are formed by a conventional cutter and docker pin assembly that has been suitably modified, as explained in detail hereinafter, to provide the holes 36 extending completely through each of the layers 31 and 32 to accommodate vapor passage and to generally enhance the baking process.

The comestible product 25 is thus seen to have a structure that accommodates manufacture in a convenient snack size if desired. When the product 25 is manufactured in accordance with the method of the present invention described in detail hereinafter, the insert article 30 can be relatively easily removed with little or no breakage of the food material.

PREFERRED EMBODIMENT OF THE METHOD FOR MAKING THE COMESTIBLE PRODUCT

FIGS. 2-5 sequentially illustrate the steps in the preferred embodiment of the method for forming the comestible product 25 on a high speed, high volume basis. The food material is first formed into a generally planar sheet 40 as illustrated in FIG. 2.

The sheet 40 has a plurality of pairs of first and second sections, designated by reference numerals 41 and 42, respectively. The sections 41 and 42 correspond to the first and second layers 31 and 32, respectively, of the completed product 25 illustrated in FIG. 1 and described above.

The pairs of first and second sections 41 and 42, respectively, are arranged with the first and second section of each pair positioned side-by-side. The pairs of side-by-side sections are arranged in a substantially contiguous array of ranks and files oriented perpendicular and parallel, respectively, to a selected direction which is indicated in FIGS. 2-5 by the arrow 44 and which may be a conveying direction.

The sections 41 and 42 need not be specifically defined by physical demarcation structures, lines, or the line. It is sufficient that the food material sheet 40 have sufficient size so as to accommodate at least one pair of first and second sections, and the first and second sections may be defined merely by imaginary lines during the subsequent manufacturing steps.

However, in the preferred embodiment of the method illustrated in FIGS. 2-5, the first and second sections 41 and 42, respectively, are physically defined by perforations or indentations and cuts in the food material.

Specifically, each pair of sections 41 and 42 is completely severed or separated, along lines 46 parallel to the conveying direction 44, from the adjacent pairs of sections in the adjacent files.

Further, indentations or perforations 48 are formed at least partially through the food material 40 along lines oriented transversely across the files between the sections. In the preferred embodiment, the perforations or partial perforations 48 function to permit separation of the section pairs after a number of processing steps have occurred. However, in the preferred embodiment, the sections in each file remain connected end-to-end until the last processing step.

Finally, in the preferred embodiment, lines of indentations or perforations 50 are at least partially formed through the food material 40 between the sections 41 and 42 of each pair of sections along lines generally parallel to the conveying direction 44.

Thus, each pair of sections 41 and 42 can be said to be defined on two opposite sides by the lines of severance 46 and on the two opposite ends by the lines of perforations 48. Within a pair of sections 41 and 42, the two sections can be said to be defined relative to each other by the line of perforations 50.

It is to be realized, however, that in other embodiments contemplated by the inventors, each section 41 and 42 in a pair of sections need not be initially formed together as part of a unitary sheet of food material 40. A separate sheet of food material could be provided for section 41 and a separate sheet of food material could be provided for section 42.

In any case, the insert article 30, which may be in the form of the paper strip, is next positioned adjacent the sections 41 and 42. FIG. 3 illustrates one form of such insert article positioning. Specifically, each insert article 30 is placed on a first section 41 with the insert article 30 being positioned inwardly of at least some of the edges of the first section 41 to define peripheral regions of the first section 41 which project beyond the insert article 30. When the method is effected by the novel apparatus described in detail hereinafter, it is also preferable to position each insert article 30 with an end of the insert article 30 projecting beyond an end of the one section 41 and onto the next rearwardly section 41 as illustrated in FIG. 3. Preferably, high speed, high volume production can be achieved by positioning or placing a plurality of insert articles 30 adjacent a plurality pairs of food material sections as illustrated in FIG. 3.

Where the insert article 30 is a strip of paper, the paper would ordinarily be a U.S.F.D.A. approved paper that is generally resistant to oil, grease, and moisture.

Next, as best illustrated in FIG. 4, relative movement is effective between each section 41 and 42 of each pair of sections so as to bring the sections in each pair into contact with each other at the peripheral regions and into contact with the insert article 30. In this manner at least a portion of the insert article 30 is substantially encapsulated and contained within the food material. In the preferred embodiment of the method illustrated in FIG. 4, the pairs of sections 41 and 42 in each file remain connected end-to-end, although the pairs of sections are laterally separated from each other (by cut lines 46 in FIG. 3). However, it is to be understood that, in alternate embodiments of the method (especially where each section is relatively long), the pairs of sections need not necessarily be connected end-to-end.

The step of effecting relative movement between the two sections 41 and 42 to bring the two sections into contact with each other around the insert article 30 may be effected by a novel folding process described in detail hereinafter or maybe effected by some other suitable process.

If the pairs of sections 41 and 42 are connected end-to-end as illustrated in FIGS. 2–4, then, the individual pairs of sections may be subsequently separated, as by breaking the food material along the lines of perforations 48 as illustrated in FIG. 5. Such breaking is preferably effected, in the preferred embodiment of the method, after cooking (e.g., baking) food material.

PREFERRED EMBODIMENT OF THE APPARATUS FOR MAKING THE COMESTIBLE PRODUCT

FIG. 6 schematically illustrates a preferred embodiment of the apparatus of the present invention. The apparatus functions according to the preferred embodiment of the method of the present invention for manufacturing the preferred embodiment of the comestible product 25 of the present invention described above. The subassemblies and components of the apparatus will first be generally described with respect to the schematic diagram of FIG. 6. Following this general description are more detailed descriptions of the subassemblies and components.

The apparatus includes conveyor means for conveying food material, in the form of a sheet 40, along a path. The conveyor means includes a first conveyor 51 and a second conveyor 52. The second conveyor 52 is located to receive the food material sheet 40 downstream of the end of the first conveyor 51.

The food material for the preferred cracker-like comestible product 25 described above is a suitable dough. The preferred composition and method of preparation of such a dough is described hereinafter.

The dough, or other appropriate food material, may be deposited on the first conveyor 51 in the form of the sheet 40 by suitable conventional means. For example, a sheeter assembly 54 may be provided with rollers 55 for rolling the food material into a sheet 40 having the desired width. The sheeter assembly 54 shown in FIG. 6 is only schematically illustrated, and the conventional components have been omitted for ease of illustration. The detailed design and specific structure of the sheeter assembly 54 forms no part of the present invention.

The dough or other food material sheet 40 is carried by the first conveyor 51 to a cutting station under a cutter and docker pin assembly 56 for (1) forming the holes 36 (FIG. 1), (2) cutting the dough along the severing lines 46 (FIG. 2), (3) forming the transverse perforations 48 (FIG. 2), and (4) forming the longitudinal perforations 50 (FIG. 2). A more detailed description of the cutter and docker pin assembly 56 is presented hereinafter.

The sheet 40 is conveyed from the cutter and docker pin assembly 56 to an insert article placing station which has one or more insert article placer assembies or means 60 for placing the insert articles, such as the strips of paper 30, on the food material or dough sheet 40. FIG. 6 shows two such placer means 60 which are longitudinally offset in the conveying direction 44 and which are also laterally offset in the direction transverse to the conveying direction 44. One of the placer means 60 functions to place insert articles 30 on one-half of the width of the sheet 40 and the other of the placer means 60 functions to place insert articles 30 on the other half of the sheet 40.

Each placer means 60 includes a plurality of magazines 62 which each hold a plurality of paper strips 30 in a stacked, face-to-face relationship. Each placer means 60 also includes a vacuum-actuated gripper means 64 for gripping the paper strips 30 from the magazines 62, for positioning the strips 30 above the food material sheet 40, and for releasing the gripped strips 30 on the food material sheet 40. The detailed construction and operation of the placer means 60 is described hereinafter.

As the food material sheet 40 leaves the placer means 60, the deposited paper strips 30 have the orientation illustrated in FIG. 3. The food material sheet 40 carrying the paper strips 30 is conveyed from the placer means 60 to a folding station at which is located a folding assembly or cam means 190 for folding a portion of the food material sheet 40 in each file onto another portion of the food material sheet 40 in that file so as to form two layers of the food material. This results in the food material having the structure illustrated in FIG. 4 wherein the insert article or paper strip 30 is completely enclosed by the food material. The detailed structure and operation of the folding assembly or cam means 68 is described hereinafter.

The files of the folded portions food material sheet 40 are next conveyed from the first conveyor 51 over a gap to the second conveyor 52 and into a roller assembly comprising a lower roller 70 and an upper roller 72. The second conveyor 52 is inclined upwardly from the end of the first conveyor 51, and, as the folded files of the sheet 40 pass through the rollers 70 and 72, the overlapping layers of the dough are pressed together to enhance the degree of contact. The structure and operation of the second conveyor 52 and of the rollers 70 and 72 are described in more detail hereinafter.

The files of the folded dough are next conveyed through a topping dispenser 76, if desired, for the application of a suitable topping (e.g., salt). If the food material is to be cooked, the food material is then conveyed through a suitable cooking apparatus. In the case of the preferred embodiment of the comestible product 25 described above, the food material is conveyed through an oven 80 where the product is baked. The operation of the oven 80 is described in more detail hereinafter.

Finally, the baked product is conveyed to a suitable conventional breaker assembly 82 for separating the individual units of the product 25 at each end. The breaker assembly 82 may be a special design or may be a conventional design. The detailed design and specific structure of the breaker assembly 82 forms no part of the present invention.

A number of the assemblies described above with reference to the schematic diagram of FIG. 6 will next be described in more detail.

Cutter and Docker Pin Assembly

A portion of the cutter and docker pin assembly 56 is illustrated in simplified form in FIG. 7B. The assembly 56 may be regarded as a novel modification of a typical conventional cutter and docker pin assembly manufactured and sold in the U.S.A. by Lindgren & Knapp, Inc., 5333-39 North Kedzie, Chicago, Ill., U.S.A. The relevant portion of such a conventional cutter and docker pin assembly is illustrated as prior art in FIG. 7A.

The conventional cutter and docker pin assembly is a conventional 38 inch, two row, 32 cup cracker cutter with two docker plates and inside clearers. The conventional operating mechanisms and docker pins have been omitted for ease of illustration.

The illustrated portion of the conventional assembly includes two parallel lineal cutter bars 86. These function to sever a sheet of dough D along lines parallel to a conveying direction.

The conventional assembly illustrated in FIG. 7A also includes parallel transverse cutter bars 88 for severing the dough D transversely relative to the conveying direction 45. The conventional assembly also includes a longitudinal perforator bar 90 spaced equidistantly between adjacent lineal cutter bars 86. Each perforator bar 90 is notched to define teeth 91 for forming perforations 51 in the dough D.

In FIG. 7A, there has been no attempt to illustrate the precise number of teeth 91 that extend between adjacent transverse cutter bars 88, and the teeth 91 are merely generally represented for ease of illustration. Vertically reciprocable docker pins (not illustrated) are also conventionally provided for forming holes through the dough D.

The above-described conventional cutter and docker pin assembly functions to form cracker dough into individual dough segments with a midpoint line of perforations 51.

According to the teachings of the present invention, novel modifications can be made to the above-described conventional cutter and docker pin assembly for use in manufacturing the above-described comestible product 25 of the present invention. Specifically, as best illustrated in FIG. 7B, each lineal cutter bar 86' is sharpened along the bottom edge 86A' so that it is about only one-half the width of the conventional lineal cutter bar 86.

Further, each perforator bar 90' differs from the conventional perforator bar 90 in that the modified perforator bar 90' has less teeth 91'. Preferably, the modified perforator bar 90' has only half as many teeth 91' as does the conventional perforator bar 90. Each perforator bar 90' functions to form the perforations 50 in the food material sheet 40.

In FIG. 7B, only a few teeth 91' are shown between adjacent transverse cutter bars 88' for ease of illustration. Preferably, the mumber of teeth 91' is equal to about one-half of the number of teeth 91 on the conventional assembly perforator bar 90. The fewer number of teeth 91' on the modified assembly perforator bar 90 results in fewer perforations 50. Consequently, there is more unsevered food material holding together the sections 41 and 42 of the food material sheet 40. As described hereinafter in detail, when the sections 41 and 42 are folded, the folding is easily effected along the line of perforations 50, but the sections 41 and 42 of a folded pair do not separate.

Additionally, in the modified assembly illustrated in FIG. 7B, each transverse cutter bar 88' is notched to define teeth 89'. Thus, the teeth 89' form the transverse perforations 48 in the food material sheet 40. Preferably, each transverse cutter bar 88' is further modified by removing about 0.01 inch of material from the bottom edge of the bar. That is, the bottom of each transverse cutter bar 88' terminates at an elevation about 0.01 inch above the bottoms of the lineal cutter bars 86' and perforator bars 90'. This is indicated by dimensions A in FIG. 7B. As a result of this unique transverse cutter bar structure, the perforations 48 only partially penetrate the food material sheet 40.

Insert Article Placer Assemblies

FIG. 8 illustrates the two insert article placer assemblies or means 60 mounted over the first conveyor 51. In the illustrated preferred embodiment, each placer assembly 60 is disposed over one-half of the width of the food material sheet 40. For convenience of installation, the assemblies 60 are longitudinally offset along the length of the first conveyor 51 as is best illustrated in FIG. 9. Each insert article placer assembly 60 is provided with eight magazines 62 for receiving a stack of insert paper strips 30 in face-to-face relationship. As best illustrated in FIG. 10, each magazine 62 is oriented generally at a 30° angle relative to the horizontal surface of the first conveyor 51.

As best illustrated in FIG. 12, the bank of eight magazines 62 is provided with longitudinal guide blocks 94 supported from a suitable frame member 96. The guide blocks 94 serve to align the upper edges of the insert article paper strips 30. At the lower, or discharge, end of each magazine 62 there are two spaced-apart retaining plates 98 which engage the side portions of the forward-most strip 30 in each magazine.

As best illustrated in FIG. 9, the vaccum-actuated gripper means 64 of each placer assembly 60 includes a plurality of vacuum-actuated tubular gripping members 100. As best illustrated in FIGS. 10 and 11, each gripper means 64 includes four shafts 102 carried by a pair of spaced-apart outer end plates 104.

Each shaft 102 is mounted for rotation in a bearing 106 in each outer end plate 104. Eight gripping members 100 are mounted in each shaft 102. Each gripping member 100 is a hollow, cylindrical tube having a rubber skirt 110 (FIGS. 12 and 13) at its distal end for engaging a paper strip 30 at the discharge end of the associated magazine 62 as best illustrated in FIG. 12.

Each shaft 102 has a dead end internal bore 108 (FIG. 11) at each end of the shaft through which vacuum is drawn. Each gripping member 100, at the end opposite the rubber skirt 110, is connected via a flexible tube or hose 112 to an aperture communicating with one of the bores 108 in an end of the shaft 102 as best illustrated in FIG. 11. Each end of each shaft 102 terminates in a cavity 114 in a block 116 which is mounted to one of the outer end plates 104. The cavity 114 in each block 116 communicates through a bore 118 and flexible tube 120 with a bore 124 in an annular block 122 mounted to one of the outer end plates 104.

The bores 124 in each block 122 are adapted to communicate with a circular arc channel 126 in an nnular facing block 128 (FIGS. 11 and 11A). The channel 126 in each facing block 128 is connected to a suitable source of continuously drawn vacuum through a tube 129. Such a source of vacuum, though not illustrated, may be a conventional system for drawing vacuum and may include one or more vacuum pumps.

Each facing block 128 is biased against the mating block 122 by means of springs 130. Each spring 130 is disposed around a pin 132 extending between the block 128 and a member 130 which is restrained against rotation by a suitable fixed frame member 136.

The annular blocks 122 and 128 are disposed around a central shaft 140. The shaft 140 is mounted for rotation in bearings 148 carried on frame members 150 at each end of the shaft 140. With reference to FIG. 11, the blocks 122 and 128 on the right-hand end of the shaft 140 are disposed directly around the shaft 140. However, on the left-hand end, a non-rotatable sleeve 144, which is fixed to frame member 134, is disposed between the shaft 140 and the blocks 122 and 128.

Bushings 146 are disposed between the sleeve 144 and shaft 140 to accommodate rotation of the shaft 140 relative to the sleeve 144. A bushing 147 is disposed between the outside surface of sleeve 144 and the annular block 122 to accommodate rotation of the annular block 122 relative to the fixed sleeve 144.

With reference to FIG. 11, it is seen that an annular member 152 is keyed to the central shaft 140 adjacent the right-hand end of the fixed sleeve 144. The member 152 is fixed to an inner end plate 154 which is spaced inwardly from, and which is parallel to, the outer end plate 104 on the left-hand end. Rotation of the member 152 by the shaft 140 will cause the inner end plate 154 to rotate with the shaft 140. The inner end plate 154 and outer end plate 104 are connected together around their periphery by a cross wall 155 and are rotatable together by the shaft 140.

At the other end (on the right-hand side in FIG. 11), the block 122 is connected to the other outer end plate 104. The block 122 and connected plate 104 are rotatable about the axis of the shaft 140 and they rotate with the left-hand outer end plate 104 owing to the four shafts 102 which extend between the end plates 104.

With reference to the left-hand side of FIG. 11, it is seen that the inner end plate 154 and the associated outer end plate 104 define a space for receiving a gear train system. A stationary (non-rotating) central gear 156 is mounted to the fixed sleeve 144 about the shaft 140.

Around the stationary gear 156 are four shafts 160 which are mounted between the inner end plate 154 and outer end plate 104. An idler gear 158 is mounted for rotation on each shaft 160. Each gear 158 is engaged with the stationary central gear 156 and is adapted to rotate around the circumference of the stationary gear 156 as the shaft 140 effects rotation of the inner end plate 154 and outer end plates 104.

A planet gear 164 is mounted to each shaft 102 and is engaged with one of the gears 158. Thus, as the connected inner end plate 154 and outer end plate 104 are rotated by the shaft 140, the four shafts 102 revolve about the shaft 140 in one direction while each shaft 102 is caused to rotate about its individual axis in the opposite direction.

As noted above, the annular end blocks 122 adjacent each end of the shaft 140 also rotate with the outer end plates 104. As this occurs, each of the four bores 124 in each annular block 122 periodically communicates with the channel 126 of the mating fixed annular block 128. Thus, for a part of one full rotation of the central shaft 140, vacuum is drawn in the group of eight gripping members 100 on each shaft 102. In the preferred embodiment, the vacuum is drawn sequentially in each of the four gripping member shafts 102 for about 120° of rotation of the central shaft 140.

With reference to FIGS. 9 and 11, rotation of the shaft 140 in the "upstream" placer assembly 60 is effected through a drive chain 170 engaged with a sprocket 172 mounted to an end of the central shaft 140. The chain 170 is driven from the cutter and docker pin assembly conventional drive mechanism (not illustrated) for purpose of synchronization with the food material sections 41 and 42 formed by the cutter and docker pin assembly. This is accomplished by providing an appropriate rotary motion transmission (not illustrated) for driving the chain 17. The detailed design and specific structure of the synchronizing transmission system may be in accordance with well-known conventional teachings and form no part of the present invention.

On the other end of the shaft 140, as best illustrated in FIG. 9, a sprocket 174 is mounted for engaging a second chain 176 which is trained around a sprocket 178 on the shaft 140 of the "downstream" placer assembly 60. In this manner, both placer assemblies 60 are operated together from the common drive of the cutter and docker pin assembly 56.

FIGS. 14A, 14B, 14C, 14D, and 14E illustrate the rotational sequence of the placer assembly components during operation. For ease of illustration, only certain major components relevant to the following discussion have been shown. FIG. 14A shows one gripper means 64 oriented with the gripping members 100 of one shaft 102 positioned adjacent the ends of the magazines 62 for gripping the insert articles 30 in the magazines 62. The gripping members 100 are oriented at about a 30° angle which is the angle of inclination of the magazines 62. As illustrated in FIG. 12, the skirt 110 on each gripping member 100 engages a face of the insert article paper strip 30 at the bottom of a magazine 62.

To aid in following the sequence of operation, the corner of the gripper means 64 adjacent the magazines 62 in FIG. 14A is designated by the reference letter A. Movement of this corner A of the gripper member 64 will be followed through subsequent operational steps. The other three corners of the gripper means 64 are also designated for convenient reference by reference letters B, C, and D.

The gripper means 64 rotates about shaft 140 in the direction of arrow 180 in FIGS. 14A-14E. The individual shafts 102 on which the gripping members 100 are mounted rotate in the opposite direction indicated by arrows 182. This has the effect of moving the ends of the gripping members 100 through a hypocycloid curve path of movement. By appropriately sizing the gears (gears 156, 158, and 164 illustrated in FIG. 11 and described above with reference thereto), the gripping members 100 can be driven to a radially outermost position at three 120° spaced-apart points around the central shaft 140. One such outermost position is the position illustrated in FIG. 14A wherein the gripping members 100 at the corner A of the gripper means 64 are in contact with the paper strips 30 held in the magazine 62. From this position, the gripping members 100 at corner A are pulled away from the magazines 62 along the locus of a hypocycloid curve owing to the combined action of the rotation of the shaft 140 in the direction of arrow 180 and of the shaft 102 in the direction of arrow 182. As the gripping members 100 are moved away from the magazines 62, the forwardmost paper strips 30 in each magazine 62 are pulled away by virtue of the vacuum being maintained in the gripping members 100.

FIG. 14B shows the central shaft 140 having rotated 30° from the position in FIG. 14A. The paper strips 30 have been pulled completely free of the magazines 62.

FIG. 14C shows the central shaft 140 rotated another 30°. The gripping members 100 carrying the paper strips 30 are being moved closer to the food material sheet 40, and the gripping members 100 are being rotated downwardly by shaft 102 towards the food material sheet 40.

FIG. 14D shows the central shaft 140 rotated another 30°. At this stage, the corner A of the gripper assembly 64 is approaching its lowest point over the food material sheet 40 and the trailing corner B of the gripper assembly 64 is adjacent the magazines 62.

After the shaft 140 has rotated through another 30° increment to the position shown in FIG. 14E, the gripper assembly corner A is in its lowermost position over the food material sheet 40, and the associated gripping members 100 are substantially vertically disposed over the food material sheet 40. At this point, or just prior to the gripping members 100 reaching their vertical orientation, the vacuum gripping action is terminated to release the paper strips 30. This occurs when the bore 124 in the block 122 (FIG. 11) has been rotated out of communication with the channel 126 in block 128 (FIG. 11A). Meanwhile, of course, the bore 124 associated with the gripping members 100 at corner B of the gripper assembly 64 has rotated into communication with the channel 126 of block 128 to effect the vacuum pickup of the next paper strips 30 in the magazine 62.

It can be seen that the operation of gripping and placing the paper strips 30 is effected with continuously rotating components and, thus, can be effected at relatively high speed. Relatively high volume production can be obtained by incorporating a plurality of gripping members 100 on each shaft 102, such as the eight gripping members 100 per shaft in the preferred embodiment illustrated. A greater or lesser number of gripping members 100 may be employed. In addition, it is not necessary to use two placer assemblies 60. One placer assembly 60 may be employed or more than two placer assemblies 60 may be employed Folding Assembly The longitudinally severed food material sheet 40, with the strips of paper 30 now placed thereon, is conveyed from the placer assemblies 60 to the folding assembly 68. The folding assembly 68 includes a plurality of cam means or plows 190 associated with the first conveyor 51 for folding a portion of the severed food material sheet 40 onto another portion of the food material sheet 40 to form two layers of food material.

Figure 17:
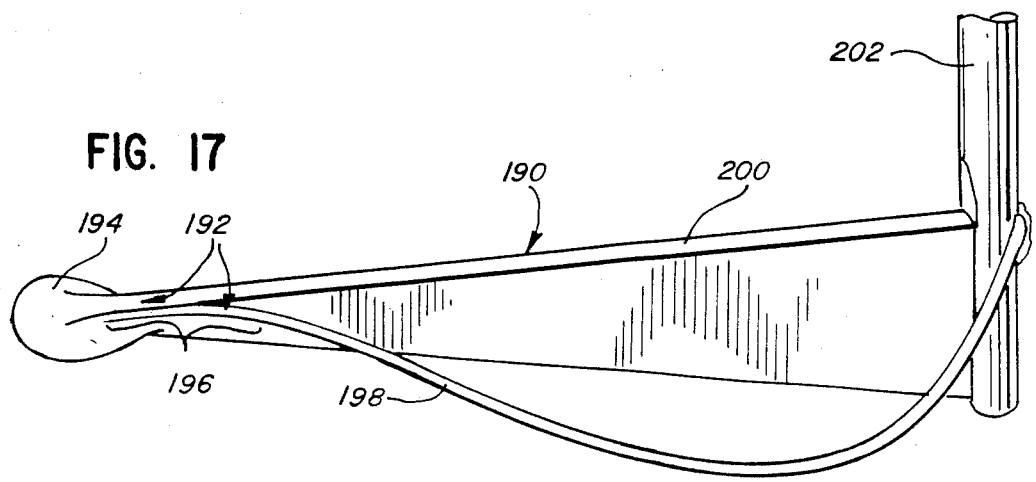
FIG. 17 is a greatly enlarged, fragmentary, perspective view of a folding assembly cam surface for folding the dough.

As best illustrated in FIGS. 15 and 17, each cam means or plow 190 includes a cam surface 192 projecting upwardly from an elevation adjacent the surface of the first conveyor 51. The cam surface 192 has a leading end portion 194 extending upstream in the conveying path. The cam surface 192 further includes an upwardly inclined portion 196 which is inclined upwardly from the end portion 194 and which also extends laterally from the end portion 194 in a direction generally transverse to the conveying path. In the preferred embodiment illustrated, the cam surface includes a wire 198.

Each plow or cam means 190 preferably also includes a generally triangular plate member 200 mounted to a vertically disposed rod 202. Both the member 200 and one end of the wire 198 are secured to the rod 202 by welding or other suitable means.

Each rod 202 has a threaded upper portion and is mounted to a horizontally disposed support member 204 by means of a lower nut 206 and an upper nut 208 (FIGS. 18 and 19). The angular orientation of each plow or cam means 190 can be adjusted by loosening the nuts 206 and 208, rotating the rod 202 by the desired amount, and then retightening the nuts 206 and 208.

The horizontal support member 204 is slidably disposed at each end on a cylindrical shafts 210 (FIGS. 19 and 20) which are each journaled in a suitable support or bearing 212 mounted to a frame member 214. The horizontal member 204 can be rotated about the horizontal axis defined by the shafts 210 so as to tilt all of the plows 190 relative to the surface of the conveyor 51. FIG. 22 illustrates the tilting of the plows 190 to bring the leading end portion 194 of each plow 190 into contact with the apron or belt surface of the first conveyor 51. Each plow rod 202 is seen to be tilted from the vertical by a small angle M. The tilting is effected by two springs 216 (FIGS. 18 and 20) which each extend from a fixed frame portion 218 to a rod 220 mounted to the top of the horizontal support member 204.

The location of the plows 190 across the width of the first conveyor 51 can also be adjusted. To this end, as best illustrated in FIGS. 15, 16, 19, and 20, a threaded adjustment rod 224 is mounted for rotation in a vertical support 226 carried in the left-hand side frame member 214. A handle 228 is provided for rotating the rod 224.

A block 230 is threadingly engaged on the rod 224 and is slidingly engaged with a guide rod 232 projecting from the vertical support 226. A member 234 is mounted to the bottom of the block 230 and is engaged with the horizontal member 204. Thus, when the threaded rod 224 is rotated by operation of the handle 228, the member 234 is driven in one direction or the other tranversely of the first conveyor 51 to adjust the position of the member 204 on the shafts 210 so that the plows or cam members 190 are properly located relative to the longitudinally severed files of food material.

Figure 16:
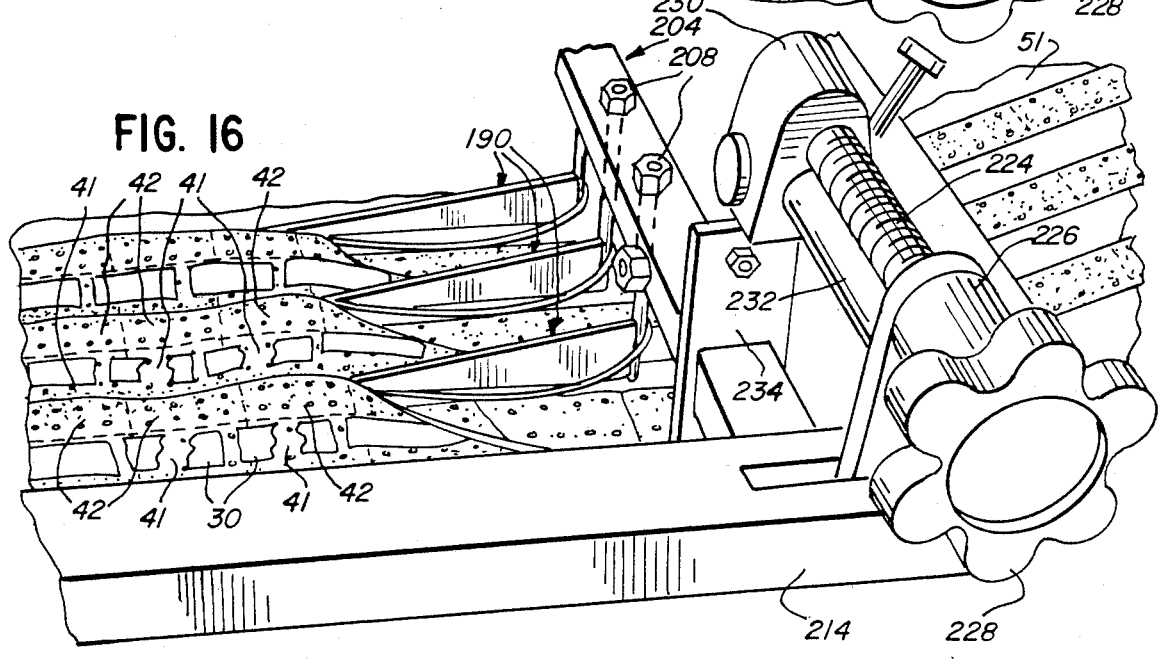
FIG. 16 is a view similar to FIG. 15 but showing dough being conveyed and folded.

FIG. 16 illustrates the plows or cam means 190 properly positioned across the first conveyor 51 and functioning to fold the food material. Each cam means 190 is positioned to be engaged with one file of food material in the food material sheet 40 so as to fold over the interconnected second sections 42 in one file onto the interconnected first sections 41 in the same file.

The folding action is shown in more detail in FIGS. 21 and 22. As can be seen in those figures, the second sections 42 ride up the leading end portion 194 of the cam means 190. The sections 42 continue to slide up the wire 198 and are gradually turned over onto the first sections 41. As best illustrated in FIG. 23, the wire 198 preferably dips downwardly about half way between the leading end portion 194 and the vertical rod 202. Thus, the folded over food material sections 42 are guided downwardly on top of the underlying sections 41.

As best illustrated in FIG. 18 and 22, the maximum elevation of the wire 198 occurs between the leading end portion 194 and the middle of the cam means plate member 200. The vertical distance between the bottom of the leading end portion 194 and the highest point of the wire 198 is indicated in FIG. 18 by the reference letter H. In the preferred embodiment illustrated, wherein the cracker-like product 25 is manufactured with the dimensions described above, the distance H is about ½ inch. The lowest point along the wire 198 is about 5/16 inch above the bottom of the leading end portion 194.

As best illustrated in FIG. 21, each plow 190 is preferably angled at about 10° relative to the conveying direction. The folded food material thus passes beneath the rear portion of the plate member 200 and beneath the vertical rod 202 as best seen in FIG. 22.

Roller Assembly

As best illustrated in FIGS. 18 and 23, the first conveyor 51 returns around a guide member 240 downstream of the plows or cam means 190. The second conveyor 52 is arranged to receive the folded food material sections 41 and 42 downstream of the plows 190 and is spaced relative to the first conveyor 51 so as to define a gap which is bridged by the food material sections 41 and 42 as the sections are conveyed along the conveying path.

The downstream edge of the gap is defined by the second conveyor 52 as it passes over the lower roller 70 which raises the conveying surface of the second conveyor 52 at that point to an elevtion greater than that of the conveying surface of the first conveyor 51. The gap between the first conveyor 51 and the second conveyor 52, in cooperation with the lower roller 70, is believed to enhance the contact between the second sections 42 and the first sections 41 of the food material.

The second conveyor 52 is upwardly inclined from the gap and passes below the upper roller 72. The folded sections 41 and 42 are thus pressed generally into surface contact with the insert article paper strips 30, and the folded sections 41 and 42 are also pressed against each other to enhance the degree of contact in the peripheral regions around the insert article paper strips 30. Preferably, the upper roller 72 is operated with a silicone release agent applied to the exterior surface of the roller.

Product Cooking Apparatus

If the food material is to be cooked, the food material sections 41 and 42 are conveyed to a suitable cooking device. In the preferred embodiment, wherein a cracker-like product 25 is manufactured, the folded sections 41 and 42 are conveyed to a conventional oven 80. One conventional oven that may be used is a 120 foot band oven manufactured and sold in the U.S.A. under the designation "MA Type" by Thos. L. Greene & Company, 202 Miley Avenue, Indianapolis, Ind., U.S.A. The operation of such an oven, including product throughput speed, zone temperatures, etc., is dependent upon, inter alia, the specific composition of the food material and size of the product. A detailed description of the operation of such an oven for a particular preferred food material composition and product size is described hereinafter.

If the food material is to be cooked, as by baking or the like, the inventors have found that the manufacture of the product in continuous files or ribbons, with the insert article paper strips 30 overlapping adjacent section ends, provides a number of advantages. First, each paper strip 30 extending between two adjacent end-to-end sections provides increased strength in the structure and helps prevent the sections from pulling apart at each end. Further, since the paper strips 30 are entirely covered by the food material as the food material is conveyed through the oven 80, the paper strips 30 are protected from the oven heat (and from the open flames in those ovens that employ gas flame).

Product Separating Apparatus

Upon leaving the cooking apparatus, such as the oven 80, the products are still connected end-to-end. The products are then conveyed through a conventional cracker breaker to break the end-to-end connections. The detailed design and specific structure of such a conventional cracker breaker 82 forms no part of the present invention.

When the individual products 25 are separated in the cracker breaker 82, the end portion of each paper strip 30 extending between the individual pieces of product 25 is exposed. This provides a visual indication that the product 25 contains the paper strip 30. It also functions as a gripping tab to facilitate complete removal of the paper strip from the product 25 before, or as, the product is eaten.

ONE PREFERRED DOUGH COMPOSITION AND BAKING PROCESS

When the product 25 is manufactured as a cracker-like snack food, a certain combination of ingredients, and a process for mixing the ingredients, have been found to provide good results. Specifically, dough is prepared by first mixing, for about 3 minutes, the following constituents: 7 lbs., 8 oz. of natural cheese emulsion; 7 lbs., 8 oz. of artificial cheddar cheese flavor additive; 62 lbs., 12 oz. of cheddar cheese flavored powder; 16 lbs. of granulated sugar; 16 lbs. of vegetable oil; 2 lbs., 5 oz. of salt; 3 lbs., 2 oz. of malt; 12 oz. of red pepper; 1 lb. of paprika; 1 lb., 10 oz. of ammonia in one gallon of water; and 122 lbs. of water introduced at about 162° F.

After the three-minute mixing period, the following constituents are added: 525 lbs. of standard grade flour; 1 lb. of soda; 3 lbs., 2 oz. of monocalcium phosphate; 2 lbs. of SS1; 7½ tablets of protease in one gallon of water; and 2 oz. of sodium sulfite in one gallon of water.

The combined components are then mixed for about 3 minutes in a scrape mixer. Then the components are mixed for about 5 additonal minutes to form the dough. The dough is then held for a lay time of about 40 minutes.

The prepared dough is subsequently formed into the uncooked sections which are folded over the insert article paper strips 30 as described in detail above. Preferably, the conveyor belts are dusted with flour to enhance folding and prevent the dough from sticking to the conveyor belt.

The dough is preferably maintained, prior to baking, at a temperature ranging between about 94° F. and about 96° F. Preferably, the moisture content ranges between about 2.5% and about 5.5%, and the pH ranges between about 6.0 and about 6.5.

Prior to baking, the product may be sprinkled with an appropriate topping, such as salt, from a conventional topping dispenser 76. The detailed design and specific structure of the topping dispenser 76 forms no part of the present invention.

The product is then baked in the MA Type oven described above. The oven has three substantially equal length zones, and the product is conveyed through the zones at a speed of about 120 feet per minute for a total baking time of about 6 minutes.

The temperature is maintained at the top of the oven in the first zone at about 450° F. and at the bottom of the oven in the first zone at about 280° F. The temperature is maintained at the top of the oven in the second zone at about 500° F. and at the bottom of the oven in the second zone at about 300° F. The temperature is maintained at the top of the oven in the third zone at about 450° F. and at the bottom of the oven in the third zone at about 310° F.

While the above-listed dough constituents per se have been used in prior art processes to make dough for conventional crackers, the particular quantity proportions, mixing steps, dough temperature and pH parameters, dough moisture parameters, and baking parameters are novel. It has been found that the above-described dough mixture, mixing process, and baking process results in a product that is baked through thoroughly and yet provides for easy release of the paper strip 30 without undesirable adhesion between the paper strip 30 and the baked dough. It has also been found that both the paper release capability and the product flavor are enhanced after about 24 hours of equilibration.

It will be readily observed from the foregoing detailed description of the invention and from the illustrated embodiment thereof that numerous variations and modifications may be effected without departing from the true spirit and scope of the novel concepts or principles of this invention.

What is claimed is:

1. A method for making a comestible product comprising the following steps:
   (A) forming food material into pairs of first and second sections with the first sections of said pairs arranged in substantially end-to-end alignment and with the second sections of said pairs arranged in substantially end-to-end alignment;
   (B) positioning an insert article adjacent one of said first sections of a pair of said sections to locate a first portion of said insert article inwardly of some of said food material of said one first section to define peripheral regions which extend beyond said insert article and to locate a second portion of said insert article projecting beyond said one first section and onto an adjacent first section of an adjacent pair of sections;
   (C) effecting relative movement between said two sections of each pair to rearrange said two sections in registration to contact each other at said peripheral regions and to contact the interposed insert article portions to substantially contain each said insert article first portion between said first and second sections of one pair of sections and to substantially contain each said insert article second portion between the first and second sections of an adjacent pair of sections;
   (D) cooking said rearranged food material sections with said insert articles contained therein; and
   (E) separating adjacent pairs of the rearranged and cooked sections whereby said second portion of each of said insert article is exposed in projecting relationship from one of said rearranged and cooked pairs of sections.

2. The method in accordance with claim 1 wherein in step (A) said food material sections are conveyed along a path and are formed from a planar sheet of said food material having a plurality of said pairs of said first and second sections with the first and second sections of each pair positioned side-by-side and with the pairs of side-by-side sections arranged in a substantially contiguous array of ranks and files oriented perpendicular and parallel, respectively, to the conveying direction.

3. The method in accordance with claim 2 wherein in step (B) said insert article is provided in the form of a paper strip and said insert article is positioned on one of said first sections in a file with an end of said strip projecting beyond an end of said one first section and onto the next rearwardly adjacent first section.

4. The method in accordance with claim 2 wherein in step (A) each pair of sections is severed from the adjacent pairs of section in the adjacent files along lines parallel to the conveying direction.

5. The method in accordance with claim 4 wherein in step (A) spaced-apart perforations are formed at least partially through said food material along lines oriented transversely across said files between said sections whereby said sections in each file still remain connected end-to-end.

6. The method in accordance with claim 5 wherein step (C) the interconnected second sections in one file are folded over onto the interconnected first sections in the same file.

7. The method in accordance with claim 6 further including an additional step, between steps (C) and (D), of conveying said folded sections, while still interconnected end-to-end, over a gap and elevating the conveying path adjacent the downstream edge of said gap.

8. The method in accordance with claim 2 wherein in step (A) spaced-apart perforations are formed at least partially through said sheet of food material between said first and second sections of each said pair of sections along lines generally parallel to the conveying direction.

9. The method in accordance with claim 1 wherein in step (B) said insert article is provided in the form of a paper strip.

10. The method in accordance with claim 1 wherein in step (A) said two sections of food material are initially formed as part of a unitary sheet of food material and wherein in step (C) one of said sections is folded on top of the other of said sections.

11. The method in accordance with claim 10 wherein in step (C) said sections of food material are conveyed along a path and one of said sections of said food material is engaged, as it is conveyed along said path, with a cam surface that has at least an upwardly inclined portion that also extends laterally over the path of movement of the other section to effect said folding of said one section on top of the other section.

12. The method in accordance with claim 10 including the additional step, between steps (C) and (D) of conveying the folded sections under a roller to press the folded sections generally into surface contact with said insert article and to press the folded sections generally into contact with each other at said peripheral regions around said insert article.

13. The method in accordance with claim 12 wherein a silicone release agent is maintained on said roller during said step of conveying the folded sections under said roller.

14. The method in accordance with claim 1 wherein in step (D) said sections are conveyed through an oven to bake said food material around said insert article.

15. The method in accordance with claim 14 wherein in step (A) said sections of food material are formed from dough prepared by (1) mixing, for about three minutes, natural cheese emulsion, artificial cheddar cheese flavor additive, cheddar cheese flavored powder, granulated sugar, vegetable oil, salt, malt, pepper, paprika, ammonia, and water, (2) adding flour, soda, monocalcium phosphate, ssl, protease, sodium sulfite, and water, (3) mixing the combined components for about three minutes in a scrape mixer, and (4) mixing the combined components for about five additional minutes to form said dough.

16. The method in accordance with claim 14 wherein in step (A) said food material is held in the form of mixed dough for a lay time of about 40 minutes and then is formed into said sections by preparing a sheet of said dough having said sections.

17. The method in accordance with claim 14 further including the step of maintaining said food material in the form of dough, prior to baking at a temperature ranging between about 94° F. and about 96° F. during said steps (A)-(C).

18. The method in accordance with claim 14 wherein in step (A) said sections of food material are formed from dough and wherein in said further step of baking said food material by conveying said material through said oven the following steps are effected: conveying said dough through three substantially equal length zones in said oven at a speed of about 20 feet per minute for a total baking time of about 6 minutes, maintaining the temperature at the top of the oven in the first zone at about 450° F. and at the bottom of the oven in the first zone at about 280° F., maintaining the temperature at the top of the oven in the second zone at about 500° F. and at the bottom of the oven in the second zone at about 300° F., and maintaining the temperature at the top of the oven in the third zone at about 450° F. and at the bottom of the oven in the third zone at about 310° F.

19. The method in accordance with claim 14 wherein in step (A) said food material is provided in the form of dough, prior to baking, at a moisture content between about 2.5% and about 5.5% and at a pH of between about 6.0 and about 6.5.

* * * * *